(12) United States Patent
Ward et al.

(10) Patent No.: US 10,052,779 B2
(45) Date of Patent: *Aug. 21, 2018

(54) WATERJET SAFETY ENCLOSURE SYSTEM

(71) Applicant: Zuluboy, Inc., Tallmadge, OH (US)

(72) Inventors: Richard Ralph Ward, Tallmadge, OH (US); Ben Adams, Cuyahoga Falls, OH (US); Christopher Indermuhle, Doylestown, OH (US)

(73) Assignee: IDEASFL, LLC, Estero, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,297

(22) Filed: Jan. 31, 2017

(65) Prior Publication Data

US 2017/0136649 A1    May 18, 2017

Related U.S. Application Data

(63) Continuation of application No. 14/692,079, filed on Apr. 21, 2015, now Pat. No. 9,592,620.

(60) Provisional application No. 61/983,237, filed on Apr. 23, 2014.

(51) Int. Cl.
*B26D 7/24* (2006.01)
*B26F 3/00* (2006.01)
*B23Q 11/08* (2006.01)
*B24C 1/04* (2006.01)
*B24C 9/00* (2006.01)

(52) U.S. Cl.
CPC .............. *B26D 7/24* (2013.01); *B23Q 11/08* (2013.01); *B24C 1/045* (2013.01); *B24C 9/00* (2013.01); *B26F 3/004* (2013.01)

(58) Field of Classification Search
CPC ... B24C 7/0015; B24C 7/0023; B24C 7/0053; B24C 7/0061; B24C 1/045; B24C 1/04; B24C 9/00; B26D 7/24; B26D 7/20; B26D 2007/0018; B23Q 11/08; B26F 3/004; B26F 3/008; Y10T 83/0443; Y10T 83/0453; Y10T 83/2066; Y10T 83/2068; Y10T 83/145; Y10T 83/148; Y10T 83/152; Y10T 83/85
USPC ............................ 451/2, 451, 452, 455, 340
See application file for complete search history.

(56) References Cited

U.S. PATENT DOCUMENTS 2,242,846 A * 5/1941 Brice ........................ E04H 7/18
                                                  52/265
4,435,902 A    3/1984 Mercer et al.
(Continued)

FOREIGN PATENT DOCUMENTS

EP        0 266 638 A2    10/1987

*Primary Examiner* — Phong Nguyen
(74) *Attorney, Agent, or Firm* — Baker & Hostetler LLP

(57) ABSTRACT

A waterjet safety enclosure formed by walls using a detection device or light curtain to detect unsafe conditions. The waterjet safety enclosure walls can be used in new work areas or retrofitted and shaped to fit existing work areas. The waterjet safety enclosure walls may form a partial or complete perimeter about a work area and may be adjustable or mobile. The waterjet safety enclosure wall detects unsafe conditions when a high pressure stream of water from a waterjet cutting machine approaches, contacts or penetrates the waterjet safety enclosure wall. The detection device detects the high pressure stream of water and sends a signal to a controller to stop the operation of the waterjet cutting machine.

15 Claims, 13 Drawing Sheets

(56) References Cited

U.S. PATENT DOCUMENTS

| | | | |
|---|---|---|---|
| 5,295,425 A * | 3/1994 | Hediger | B26F 3/008 83/177 |
| 6,317,040 B1 | 11/2001 | Ikeda et al. | |
| 9,592,620 B2 | 3/2017 | Ward et al. | |
| 2004/0118980 A1 | 6/2004 | Chang | |
| 2010/0210186 A1 | 8/2010 | Panuska | |
| 2013/0025422 A1 | 1/2013 | Chillman et al. | |
| 2013/0025425 A1 | 1/2013 | Knaupp et al. | |
| 2013/0237132 A1 | 9/2013 | Vigano et al. | |
| 2014/0273768 A1* | 9/2014 | Guglielmetti | B26F 3/008 451/87 |

* cited by examiner

WATERJET SAFETY ENCLOSURE SYSTEM

This application is a continuation and claims priority to U.S. Ser. No. 14/692,079, filed Apr. 21, 2015 which claims priority to, and the benefit of, U.S. Provisional Patent Application No. 61/983,237, filed Apr. 23, 2014 with the U.S. Patent Office, both of which are hereby incorporated by reference.

BACKGROUND OF INVENTION

Field of the Invention

This invention relates in general to waterjet cutting machines. In particular, embodiments of the subject matter disclosed herein relate to an apparatus and system for a waterjet safety enclosure system.

Description of the Related Art

Waterjet cutting machines are used for cutting work pieces using a high pressure stream of water. Waterjet cutting machines are becoming more efficient and are providing more capabilities. Added capabilities include cutting on multiple axes and angles. Therefore, the direction of the high pressure stream of water is constantly moving with an increased range of motion. Safety features are necessary to protect operators, technicians, materials and equipment located in the vicinity of a waterjet cutting machine.

Current protective devices include large and immobile structures or bed walls. The immobile structures or bed walls are constructed in a manner which prevents the high pressure stream of water from penetrating the structures or bed walls. As a result, the immobile structures or bed walls are massive in terms of their thickness, length and height. Examples of these immobile structures or bed walls include thickened cast-in-place concrete walls. The cast-in-place concrete walls are used to form a perimeter of the waterjet cutting machine work area. Due to the size, the immobile structures or bed walls are expensive to build and difficult or expensive to move, remove or relocate. The present invention provides a more efficient safety enclosure system.

SUMMARY OF THE INVENTION

In an embodiment, a waterjet cutting safety enclosure system is formed by one or more walls. The walls are used to separate individuals and/or equipment from the waterjet cutting machine work area and the high pressure stream of water generated by the waterjet cutting machine. The walls of the present safety enclosure system may be constructed in a variation of sizes and combined in various configurations. Furthermore, the walls of the present safety enclosure system may be inserted within the bed walls or independently mobile, thereby, increasing access to the work area and adjustability to the size of the work area.

In one embodiment, each wall of the present safety enclosure system is constructed of panels having a void. Ideally, thin materials are used to form the wall to reduce the weight and increase mobility of wall sections. A detection device is located on the wall. In the present embodiment, the detection device forms a light curtain within the void of the wall.

The detection device uses the light curtain to identify a safe mode and an unsafe mode. A safe mode is detected when the light curtain is activated and is un-interrupted. In the alternative, an unsafe mode is detected when the light curtain is activated and interrupted. The light curtain is interrupted, and the unsafe mode detected, when the high pressure water stream of the waterjet cutting machine approaches, contacts or penetrates a wall of the safety enclosure system. The high pressure stream of water forms a steam or mist within the wall or at the void. This steam or mist interrupts the light curtain within the void.

While in safe mode the waterjet cutting machine remains in operation. In the alternative, when the unsafe mode is detected the operation of the waterjet cutting machine is stopped. As a result, the high pressure stream of water of the waterjet cutting machine is restricted to the work area.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
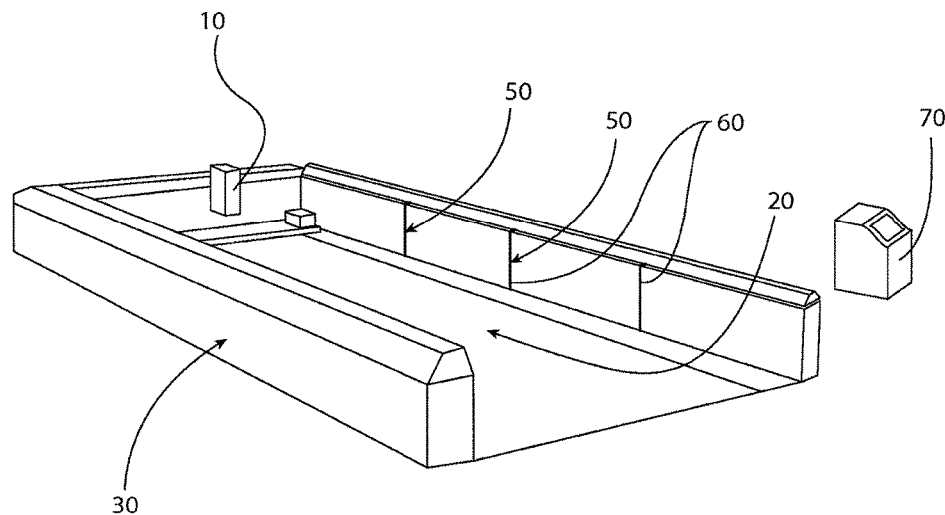
FIG. 1 is an illustration of a waterjet cutting machine work area, in a perspective view, with bed walls at the perimeter of the work area.

Embodiments of the invention comprise apparatus and systems for a waterjet safety enclosure. In particular embodiments, the waterjet safety enclosure is configured to prevent errant spray from a waterjet cutting machine from exiting a designated work area. This includes detecting errant spray at or near the waterjet safety enclosure and sending a signal to the waterjet cutting machine for controlling the waterjet cutting machine.

In particular embodiments, a system for forming a waterjet safety enclosure includes positioning one or more walls at a perimeter of a work area for a waterjet cutting machine. The one or more walls include a first end and a second end. The first end and the second end, may be positioned to each of a panel which may be additionally attached to a face of the wall. A void is defined at the wall between the first end and the second end. The one or more walls are positioned to form a barrier at a work area or to define the perimeter of the work area. Additionally or alternatively, the one or more walls may be positioned at or in a more permanent structure, such as a bed wall, to define the work area.

The system for forming a waterjet safety enclosure includes sending one or more signals between the first end and the second end of the one or more walls. The one or more signals are generated by a detection device. The detection device may include a transmitter and a receiver for transmitting the one or more signals within the void or at the wall. The transmitter is positioned opposite the receiver for sending and receiving the one or more signals, respectively. By example, the transmitter may be positioned at the first end and the receiver may be positioned at the second end. It is appreciated that the transmitter and the receiver may be positioned anywhere at or along the wall.

The one or more signals are transmitted through the void of the wall. By example, the one or more signals may be a light current generated by the detection device. In another example, the one or more signals may comprise one or more lasers generated by one or more detection devices. Additionally or alternatively, the one or more signals may be formed at or on the wall. By example, the wall may be a conduit for transmitting the one or more signals from the detection device. Such signals may include an electronic current, such as a low voltage current, that may detect the presence of errant spray from the waterjet cutting machine. Other examples of signals that may be transmitted in the void of the wall or at or on the wall may include, but are not limited to, moisture meters, temperature sensors, fluid sensors, sound sensors, vibration sensors, motion sensors, etc.

The system for forming a waterjet safety enclosure includes detecting errant spray from the waterjet cutting machine. The signal may detect the errant spray directly at the one or more walls or may detect the errant spray near the one or more walls by a mist or steam formed by the high pressure stream of water of the waterjet cutting machine. The sensitivity of the detection device and/or the signals transmitted by the detection device may be adjusted based upon the desired proximity a user selects to allow the errant spray to be at or near the one or more walls.

In one particular embodiment, the one or more walls may form an enclosure about the void. One or more panels may be attached to the wall forming this enclosure. A portion of the wall formed by a panel facing the work area may have apertures or openings. Upon approaching the one or more walls, an overspray from the errant spray penetrates the apertures or openings thereby generating a mist or steam within the void of the one or more walls. The one or more signals detect the mist or stream thereby detecting the presence of the errant spray from the waterjet cutting machine at or near the one or more walls. In other embodiments, the void between the first end and the second end may be substantially open to the work area.

The system for forming a waterjet safety enclosure includes controlling the waterjet cutting machine. The waterjet cutting machine is controlled by sending a communication from the detection device to a controller of the waterjet cutting machine. By example, upon detecting an errant spray at or near the one or more walls the detection device identifies an unsafe mode. In one particular embodiment, the unsafe mode is identified when the signal between the transmitter and the receiver is interrupted. Alternatively, when the signal between the transmitter and the receiver is uninterrupted, the detection device is in safe mode. By example, safe mode occurs when a continuous signal is sent between the transmitter and the receiver or, more generally, safe mode occurs when the unsafe mode is not detected.

In unsafe mode the detection device sends the communication to the controller of the waterjet cutting machine for a selected operation. The selected operation may be to interrupt or stop the operation of the waterjet cutting machine when the detection device identifies an unsafe mode. This may be accomplished by terminating power to the machine, by stopping the pump supplying the high pressure stream of water to the machine, or signaling a waterjet cutting machine controller to stop the machine, or the like. Alternatively, the selective operation may be to redirect the stream of errant spray away from the perimeter of the work area. Comparatively, in safe mode the detection device may send the communication to the controller of the waterjet cutting machine directing the waterjet cutting machine to maintain normal operation.

Referring now to the figures, FIG. 1 illustrates a waterjet cutting machine 10 in a work area 20 with a controller 70. The work area 20 is surrounded by permanent bed walls 30 made of cast-in-place concrete. The wall 40 of the safety enclosure system, as further depicted in FIGS. 2-4, may be coupled with the bed walls 30 used to form a perimeter at a work area 20 or to modify the work area 20 within the bed walls 30. The bed walls 30 may be retrofitted or constructed to receive the walls 40 of the present safety enclosure system. Any suitable mounting assemblies or supports 50 may be provided to support wall 40 about the waterjet cutting machine 10. Supports 50 may include a bracket, frame, recess, slot or other device capable of supporting the wall in a selected location and orientation relative to the waterjet cutting machine 10. In the example shown, support 50 includes a recess 60 formed in the bed walls 30. In summary, this particular embodiment illustrates that wall 40 of the safety enclosure system may be retrofitted into an already existing work area 20.

Figure 2:
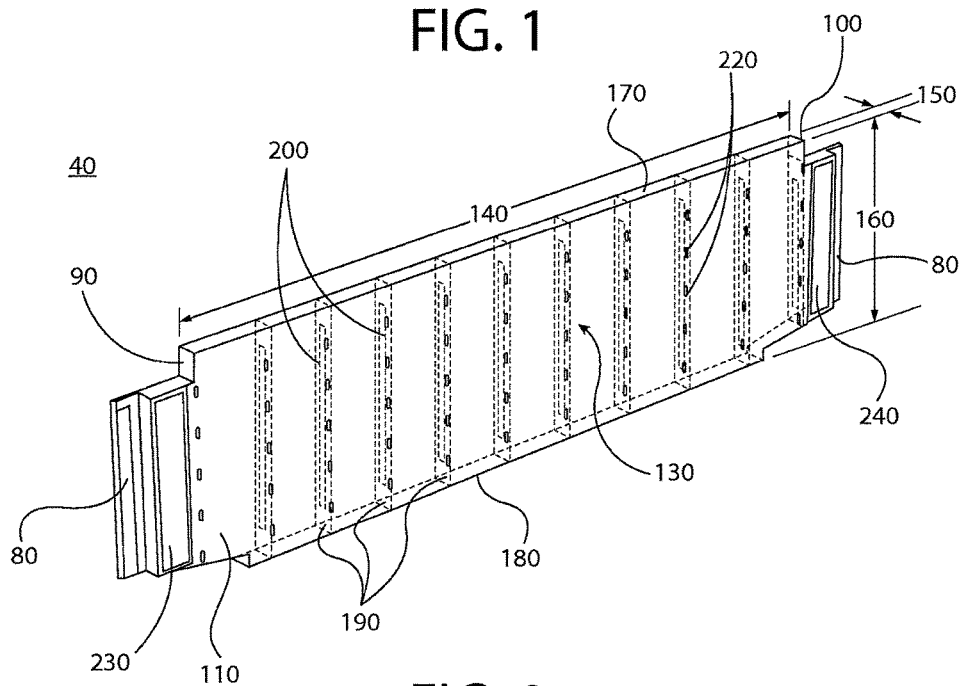
FIG. 2 is an illustration of an embodiment of a waterjet safety enclosure wall in perspective view, in accordance with the subject innovation.
Figure 3:
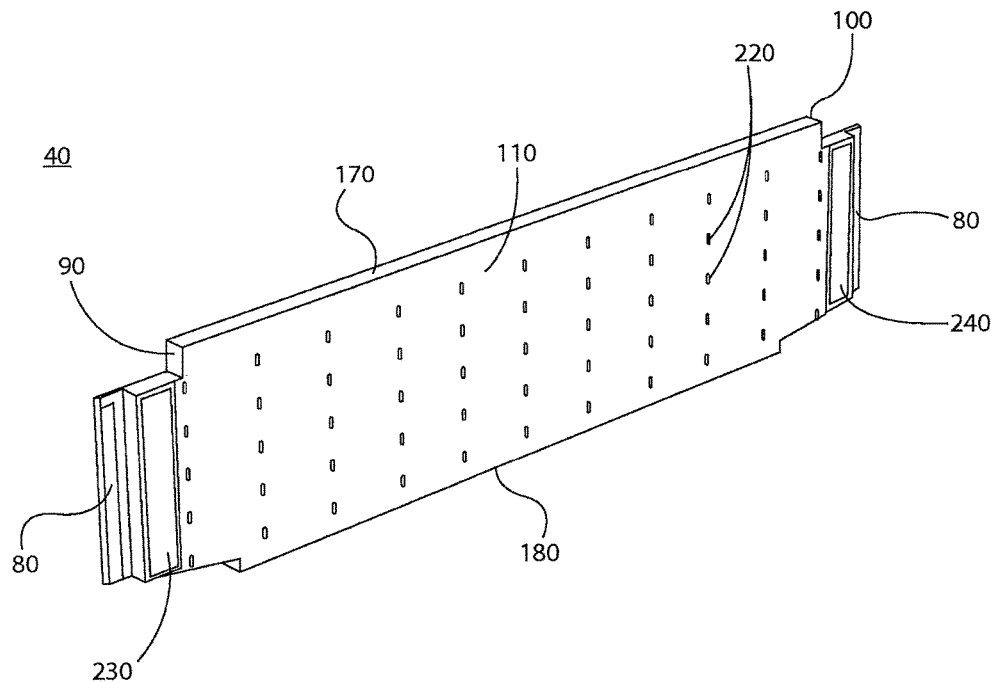
FIG. 3 is an illustration of an embodiment of a waterjet safety enclosure wall in perspective view facing a front panel, in accordance with the subject invention.
Figure 4:
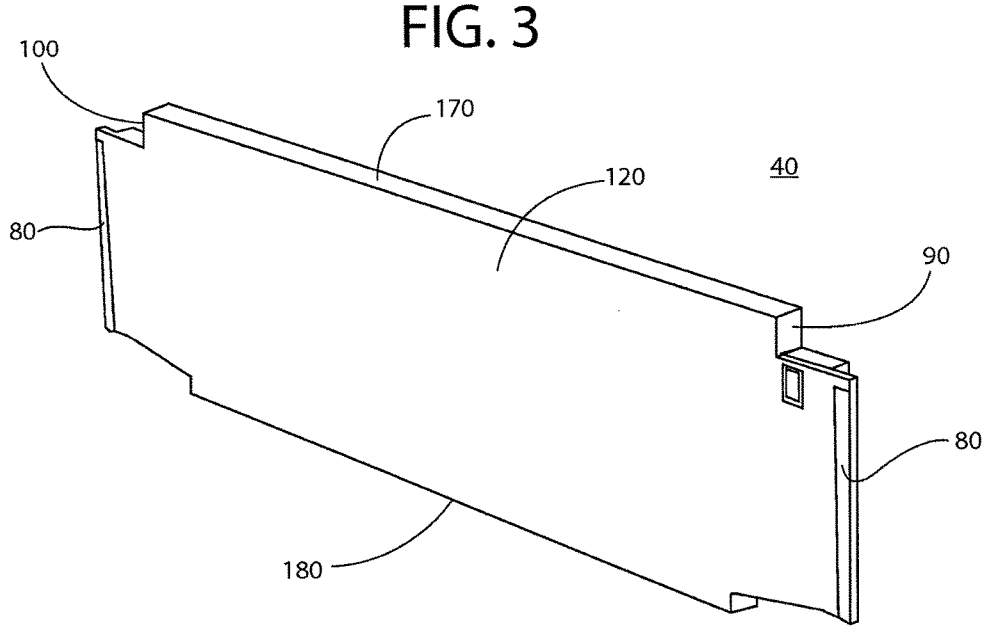
FIG. 4 is an illustration of an embodiment of a waterjet safety enclosure wall in perspective view facing a rear panel, in accordance with the subject invention.

Referring to FIGS. 2-4, a safety enclosure system may include one or more walls 40 that operate or deactivate the waterjet cutting machine upon detecting errant spray. Errant spray is formed when the pressurized stream of the waterjet cutting machine is at or near wall 40 which defines a perimeter, or a portion of the perimeter, of the work area 20. Wall 40 is used to separate individuals, materials, and/or equipment from the waterjet cutting machine work area 20 and the high pressure stream of water generated by the waterjet cutting machine 10. Wall 40 may form a partial perimeter or entire perimeter of a work area 20. In one particular embodiment, the wall 40 includes a pair of braces 80 extending outward from the first end 90 and the second end 100. The braces 80 are received in recess 60 to hang the wall 40. It will be understood that other types of support surfaces including but not limited to hooks, hangers, tabs, posts, and the like may be used to the same effect. While any orientation of the wall 40 may be made, the example shows a vertical recess 60 that supports wall 40 in a vertical orientation. While the support 50 is shown extending into the interior of bed wall 30, it will be appreciated that support 50 may also be attached to the existing exterior of bed wall 30. Further, the support 50 may be provided at one or more locations. Multiple locations may be provided to give the user the opportunity to change the location of wall 40 and/or to provide a multiple wall system.

While the present example of FIG. 1 shows a work area 20 defined at least partially by existing bed walls 30, it will be understood that the work area 20 may be comprised entirely of one or more walls 40 of the present safety enclosure system. Wall 40 of the present safety enclosure system may be constructed in a variation of sizes and combined to form various configurations. Similarly, the work area 20 may be constructed in a variation of sizes including a small footprint or a much larger footprint, as depicted by FIG. 1. Furthermore, wall 40 of the present safety enclosure system may be mobile and adjustable within the bed walls 30 or independently mobile, thereby, increasing adjustability of and access to the work area 20.

Figure 5:
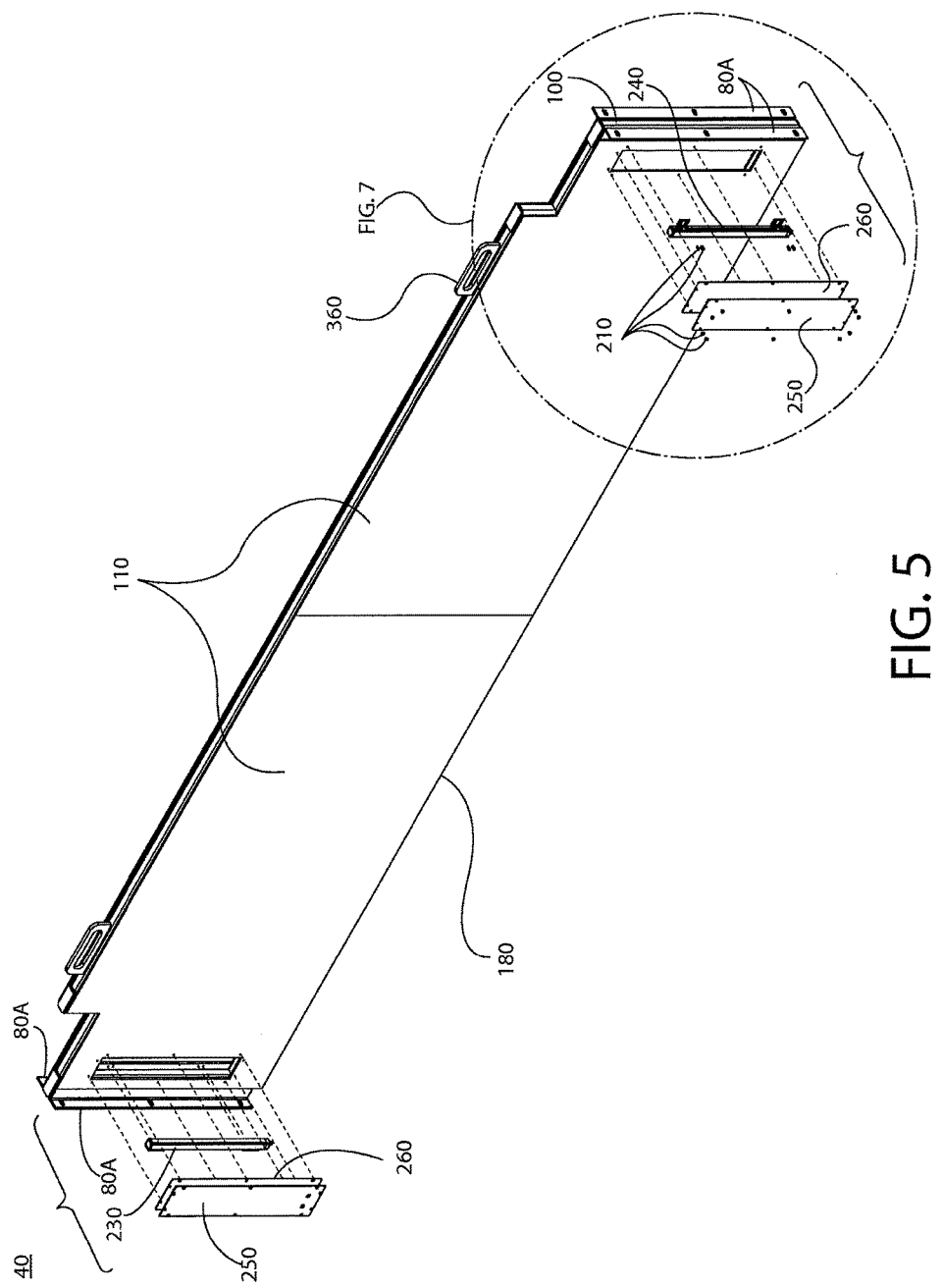
FIG. 5 is an illustration of an embodiment of a waterjet safety enclosure wall in perspective view with an exploded view of the detection device, in accordance with the subject invention.
Figure 6:
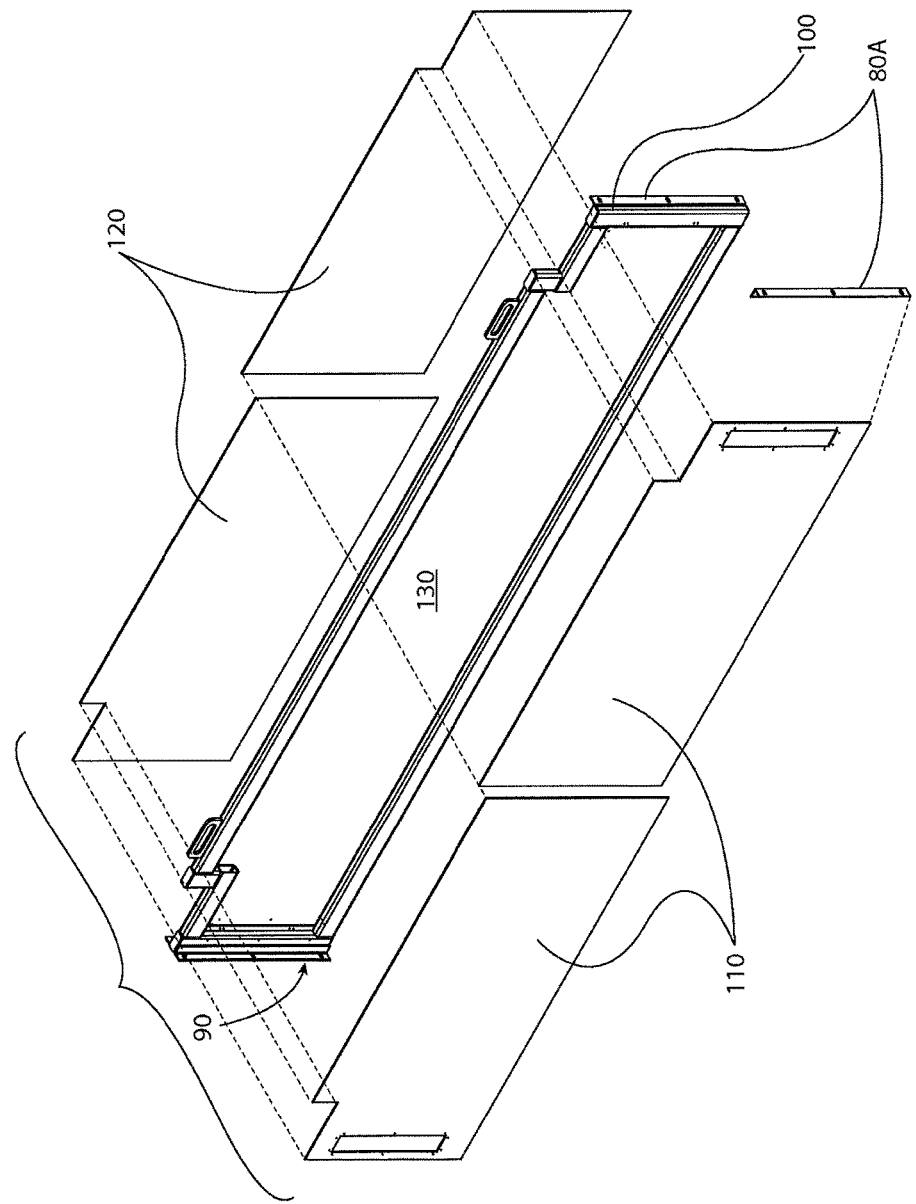
FIG. 6 is an illustration of an embodiment of a waterjet safety enclosure wall in perspective view with an exploded view of the front panels, the rear panels, and an angle bracket, in accordance with the subject invention.
Figure 9:
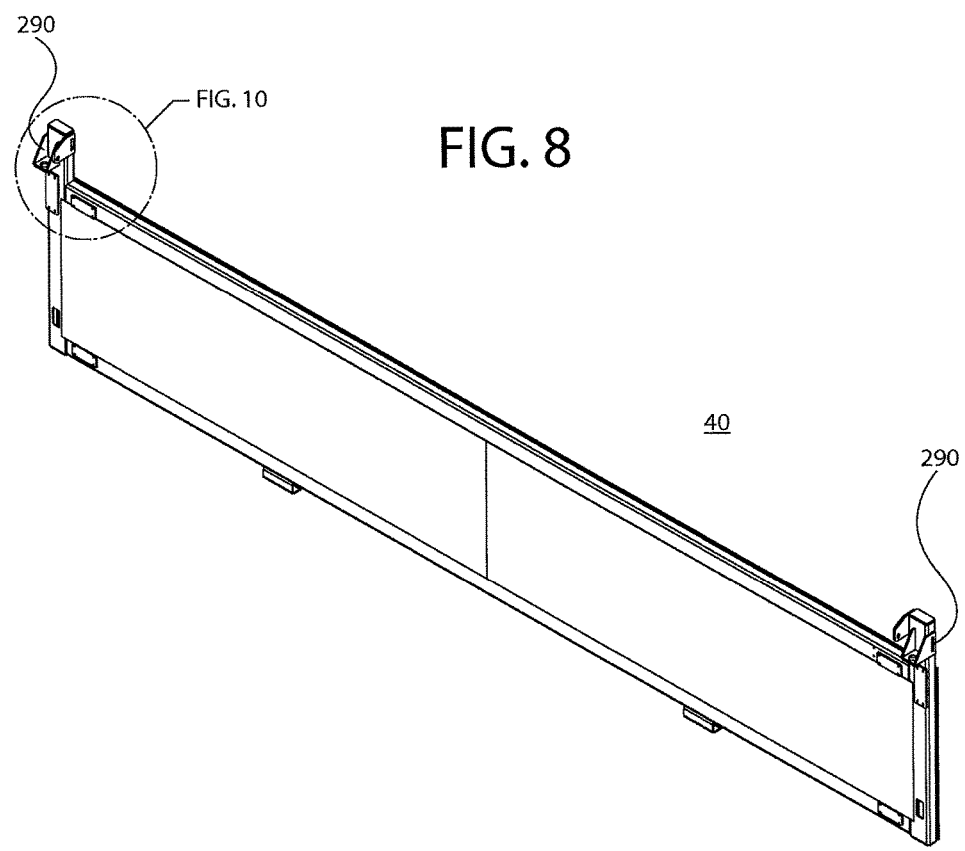
FIG. 9 is an illustration of an embodiment of a waterjet safety enclosure wall in a perspective view, illustrating lift brackets for attaching to a lifting mechanism, in accordance with the subject invention.
Figure 10:
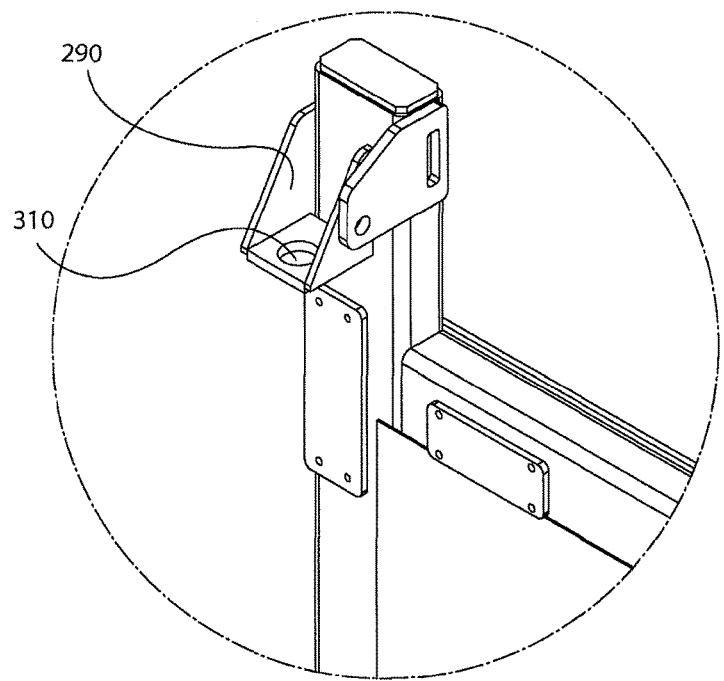
FIG. 10 is an illustration of an embodiment of a waterjet safety enclosure wall in partial view of a lift bracket of FIG. 9, in accordance with the subject invention.
Figure 11:
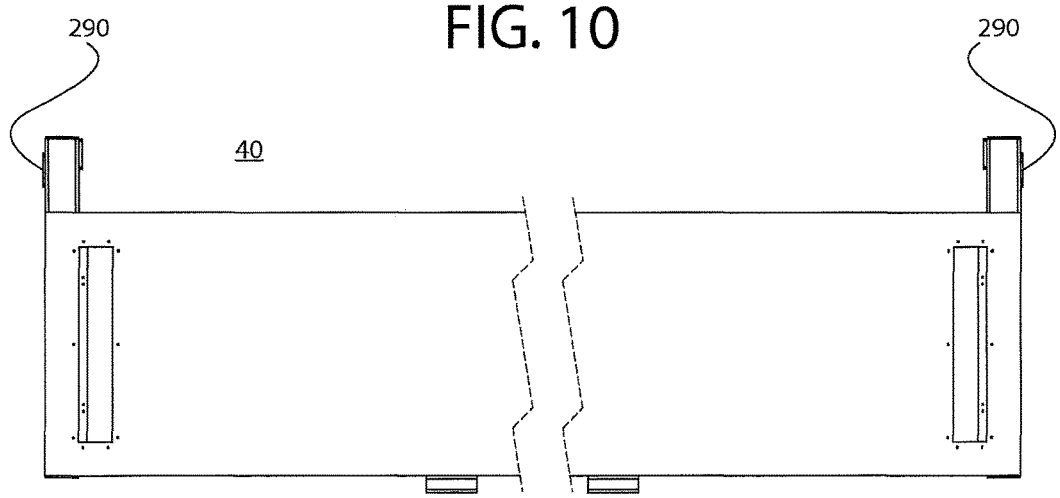
FIG. 11 is an illustration of an embodiment of a waterjet safety enclosure wall in a front view facing a front panel with lift brackets for attaching to a lifting mechanism, in accordance with the subject invention.
Figures 12, 13:
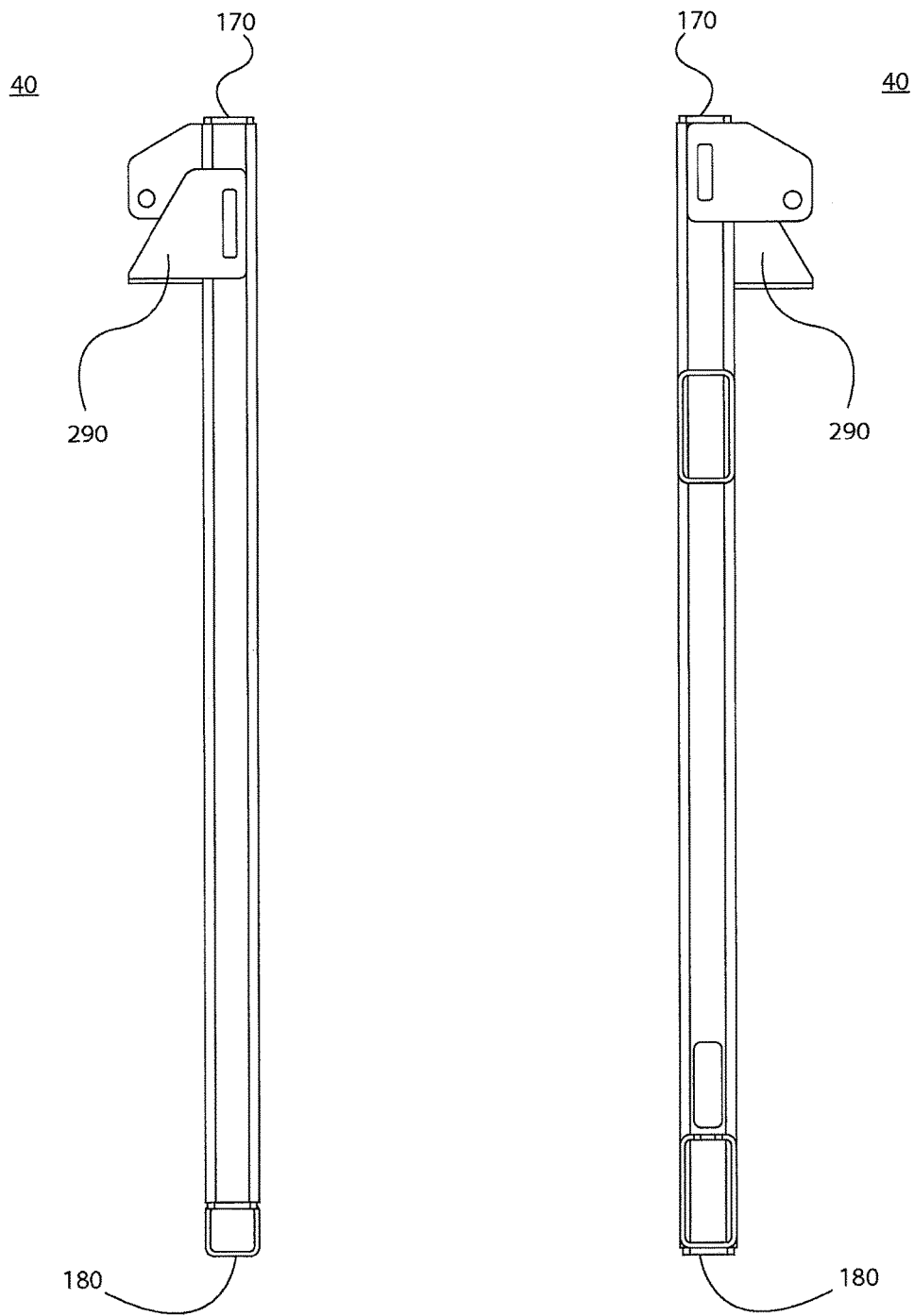
FIG. 12 and FIG. 13 are illustrations of an embodiment of a waterjet safety enclosure wall, from opposite sides, with lift brackets for attaching to a lifting mechanism, in accordance with the subject invention.
Figure 14:
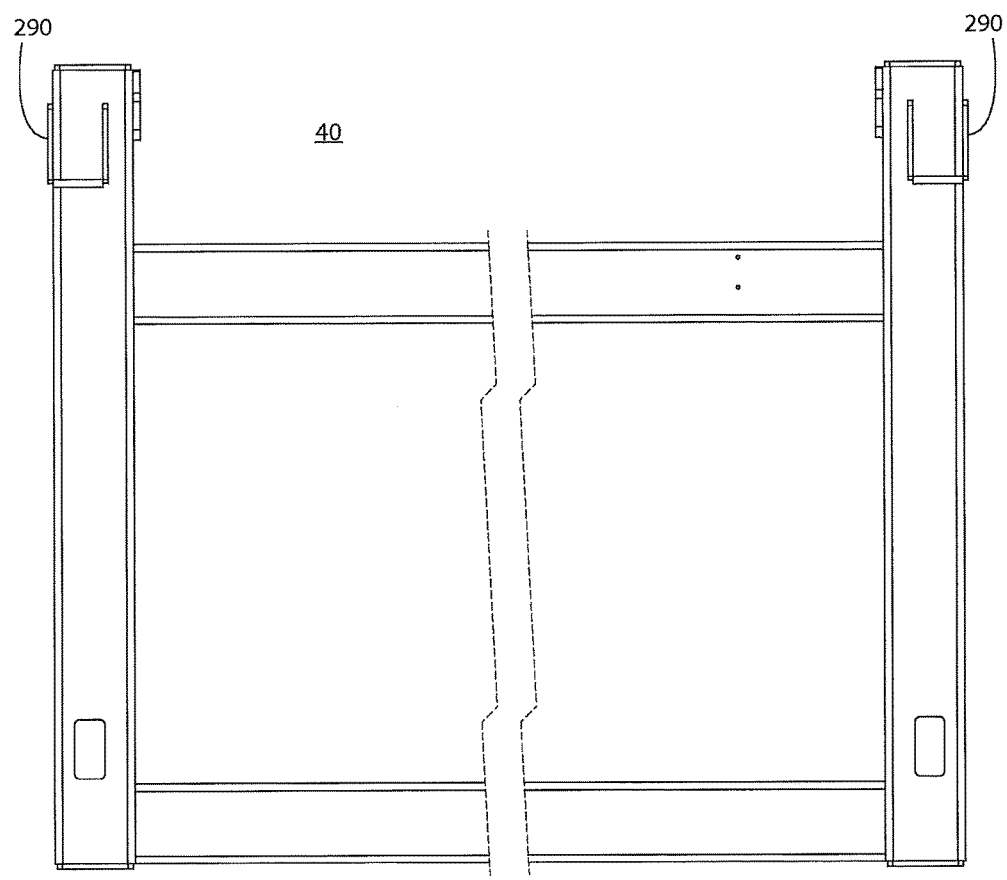
FIG. 14 is an illustration of an embodiment of a waterjet safety enclosure wall in a back view facing a back panel with lift brackets for attaching to a lifting mechanism, in accordance with the subject invention.
Figure 15:
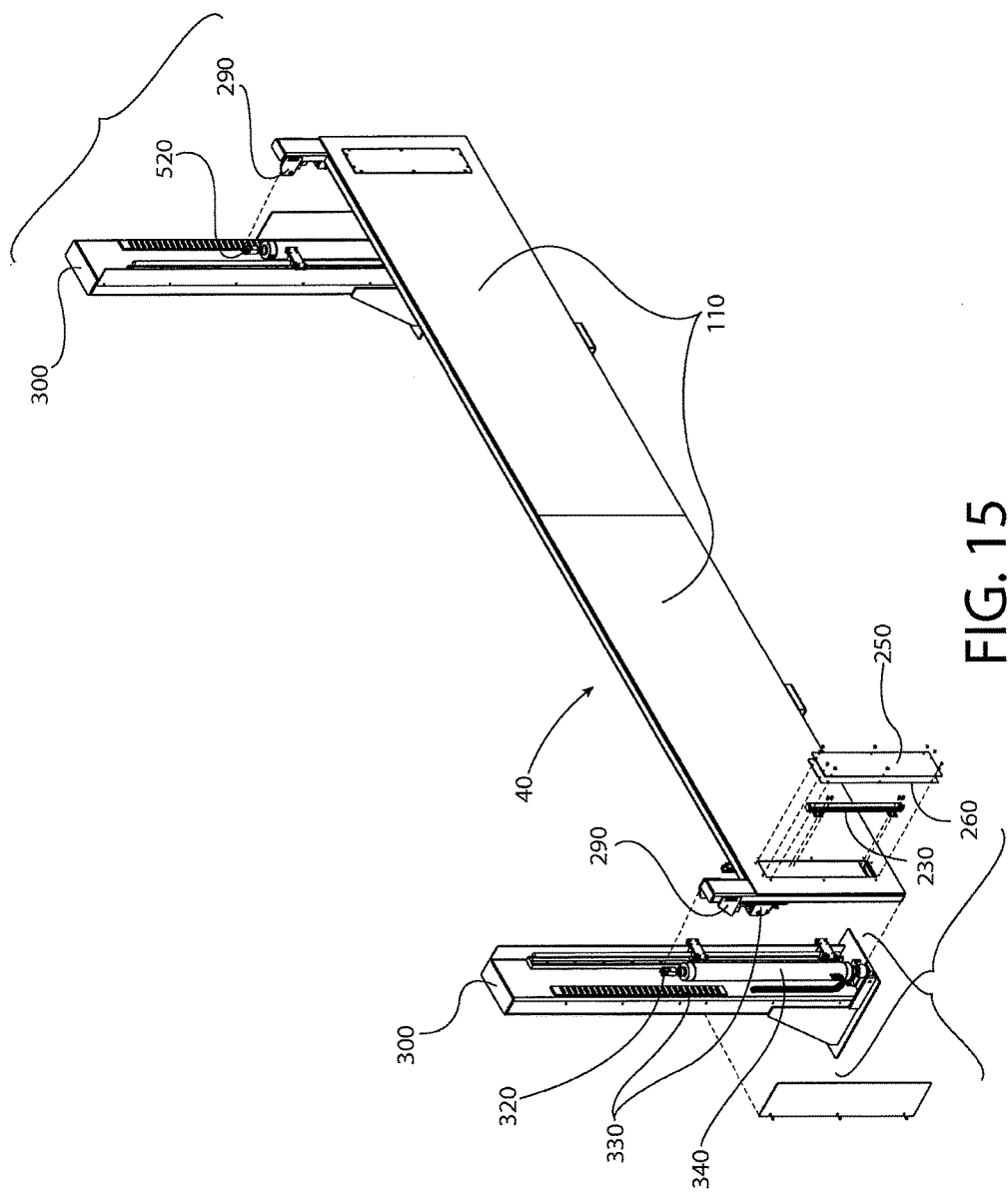
FIG. 15 is an illustration of an embodiment of a waterjet safety enclosure wall in perspective view with an exploded view of the lifting mechanism, wall and detection devices, in accordance with the subject invention.
Figure 16:
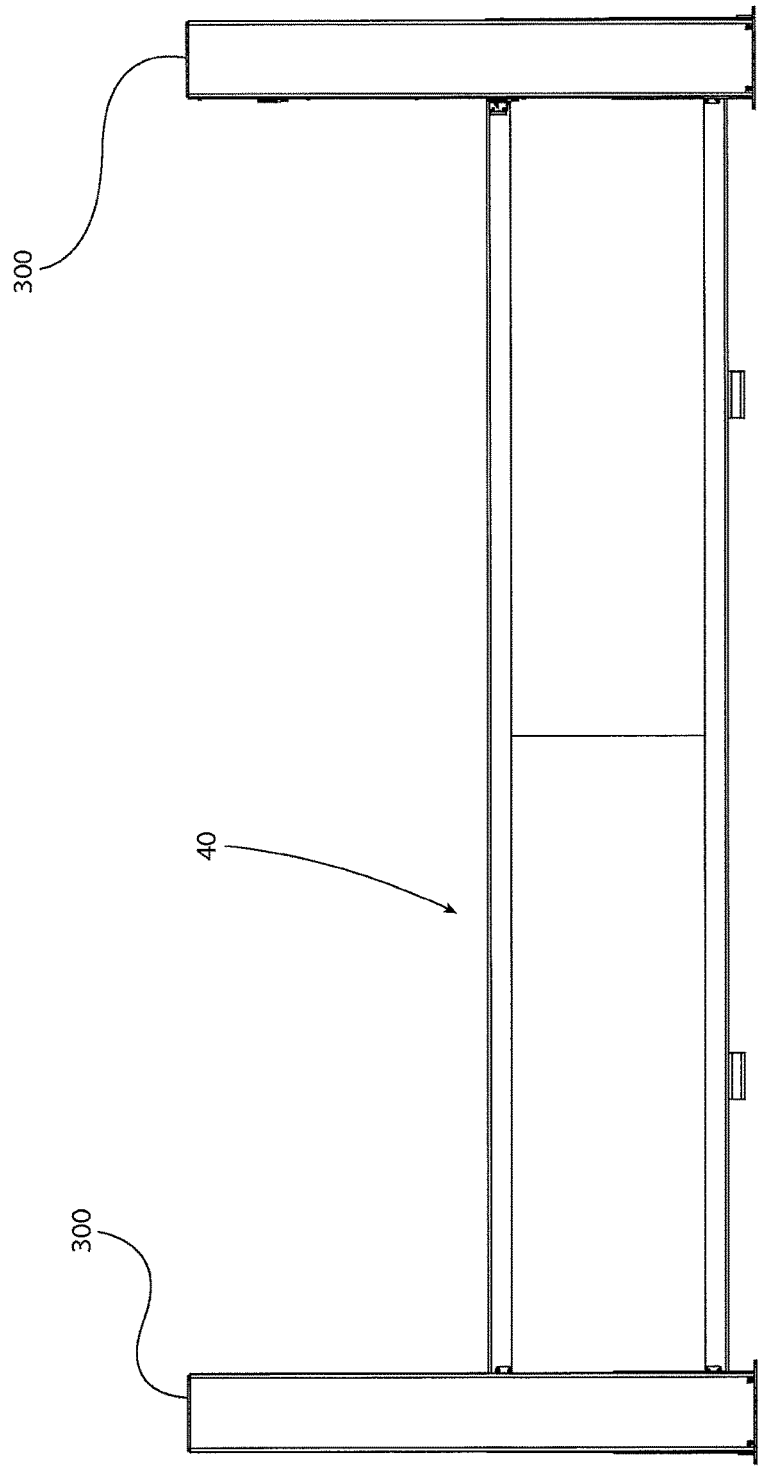
FIG. 16 is an illustration of an embodiment of a waterjet safety enclosure wall attached to a lifting mechanism, in accordance with the subject invention.
Figure 17:
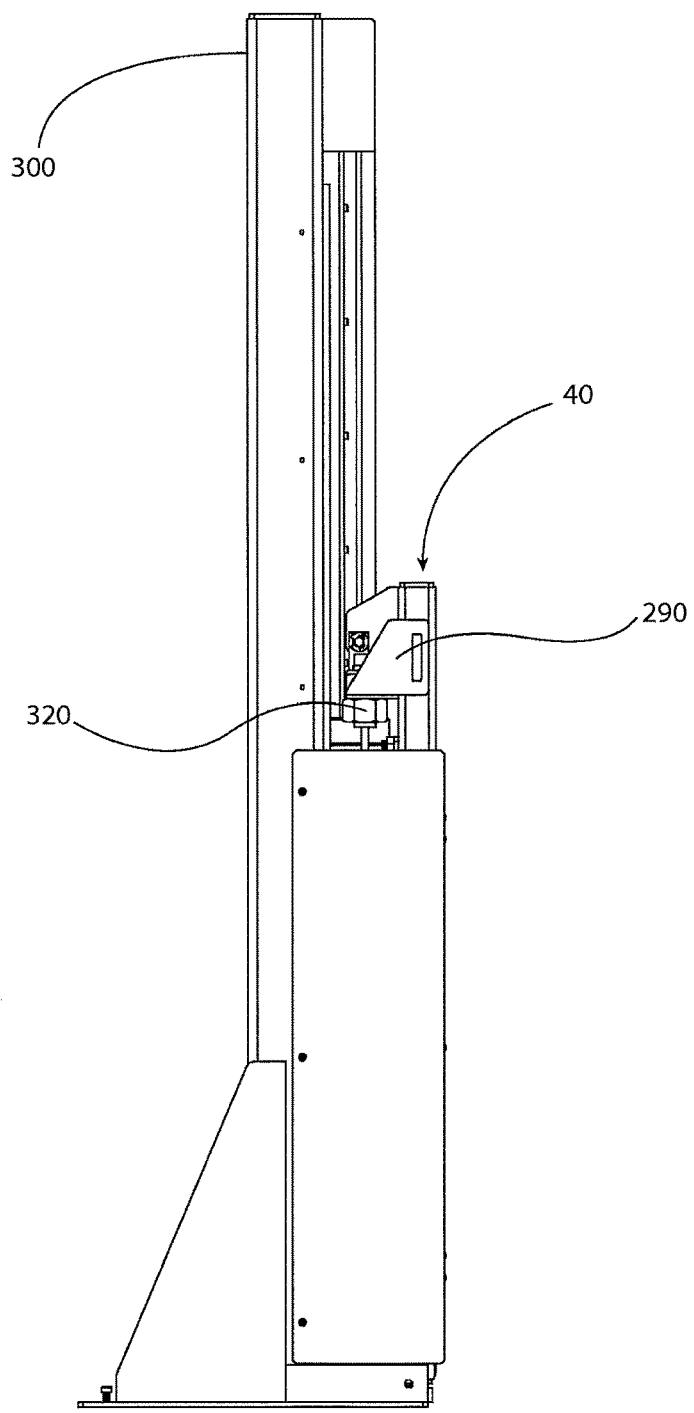
FIG. 17 is an illustration of an embodiment of a waterjet safety enclosure wall in a side view and attached to a lifting mechanism, in accordance with the subject invention.

According to one embodiment of the invention as illustrated by FIGS. 2-4, wall 40 includes a front panel 110 and/or a rear panel 120 having a first end 90 and a second end 100 separated by a length 140 of wall 40. The first end 90 and the second end 100 define a void 130 therebetween. First end 90 and second end 100 may extend inward from a front panel 110 such that void 130 formed between front panel 110 and a rear panel 120 has a width 150 generally corresponding to the width of the ends 90, 100 between panels 110,120. As illustrated by FIGS. 5-6, the front panel 110 and the rear panel 120 may be constructed of one or more panels. Further, a height 160 of the wall 40 may be formed by a top end 170 and a bottom end 180 with the void 130 between the top end 170 and the bottom end 180. The first end 90, second end 100, front panel 110, rear panel 120, top end 170 and bottom end 180 form a perimeter around void 130. In the present embodiment, void 130 is shown as being generally rectangular. However, void 130 may take any shape, including square, oval, etc. The ends and panels of the wall 40 may be constructed of any suitable material(s) that include metals, wood, plastics, etc. In an alternative embodiment, as illustrated by FIGS. 9-10, the one or more walls may be constructed without the front panel 110, top end 170, and/or bottom end 180 and include only a frame with one or more rear panels 120.

As illustrated in FIGS. 2-4, it is contemplated that additional framing members 190 may be used to provide support to the one or more of the panels or the one or more walls 40, in general. The wall 40 of the safety enclosure system may include one or more framing members 190 that attach to one or more of the panels. In the example shown, more than one framing members 190 are spaced at equal distances between ends 90, 100, dividing void 130 into segments. As discussed more completely below, framing members 190 may include slots 200 that connect the void segments and allow sensing communication through the void 130 in the presence of the framing members 190. The framing members 190 are shown oriented parallel to ends 90, 100 and generally extend vertically between front and rear panels 110, 120. It will be appreciated that other orientations may be used to provide reinforcement for the panels. Likewise, while the depicted framing members 190 are constructed as thin-wall slender frame members, members having other shapes, thicknesses, and configurations may be used to the same effect.

Framing members 190 may be fastened to the interior or exterior of wall 40 in any known manner including mechanical fasteners, such as screws, clips, tabs, bolts, welds and the like or an adhesive fastener, such as a glue, calking and the like. For sake of simplicity, these will generally be referred to as fasteners 210. In the example shown by FIGS. 2-3, one or more tabs 220 extend from framing member 190 to engage an opening in a panel of wall 40 to fasten framing members 190 to front panel 110. While the front panel includes the openings in the depicted example, the rear panel may have similar openings or both panels may be provided with openings with tabs extending from both sides of framing members 190 for attachment.

Figure 7:
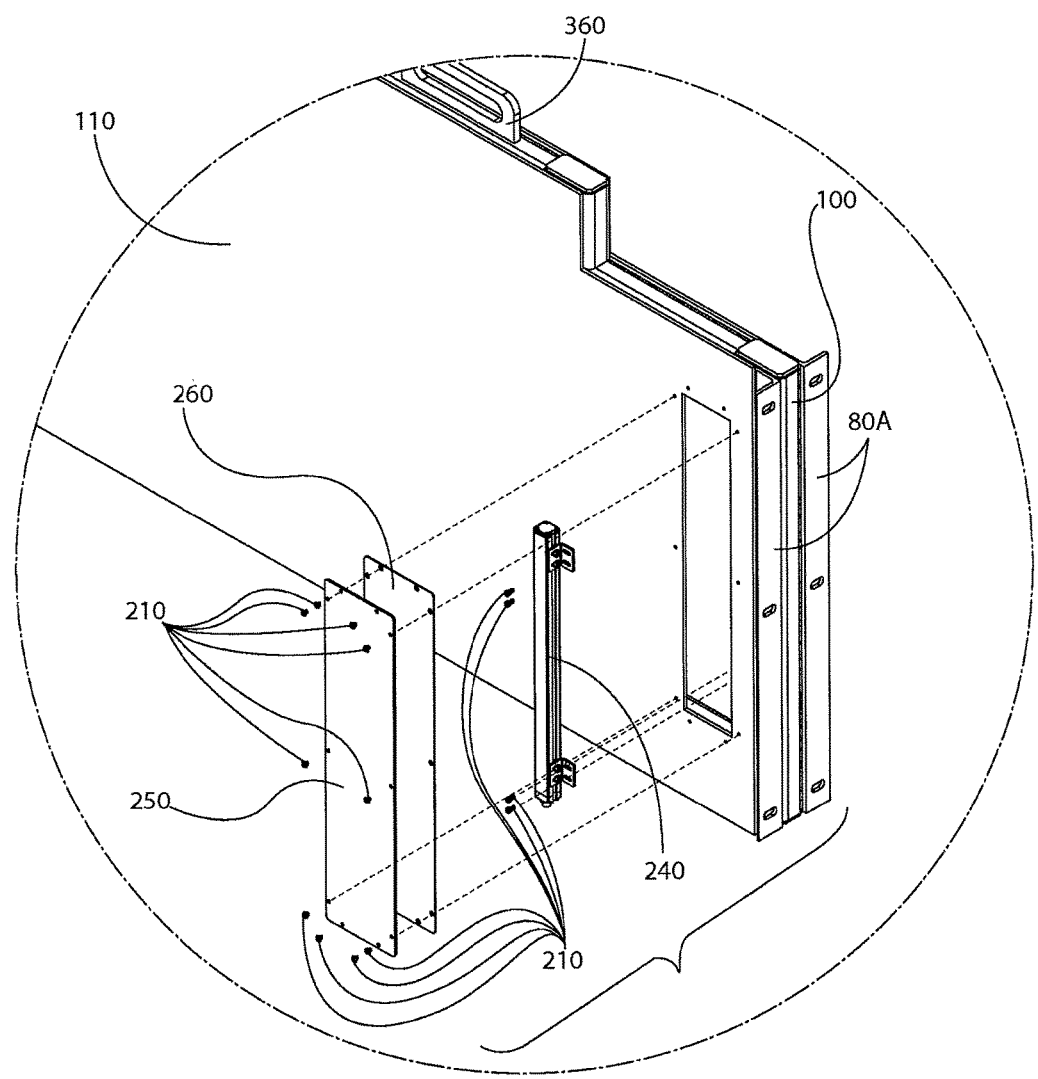
FIG. 7 is an illustration of an embodiment of a waterjet safety enclosure wall in a partial view of FIG. 5 with an exploded view of the detection device, in accordance with the subject invention.

Referring now to FIGS. 5-10 wall 40 is illustrated with an alternative support for fastening wall 40 to a second wall or to existing bed walls without retrofitting or forming slots within the bed walls. As illustrated by FIG. 5-7, one or more angle braces 80A are attached to the first end 90 and the second end 100. In this particular embodiment, one or more angle braces 80A are attached to the front panel 110 and rear panel 120. The system of attachment for angle braces 80A to wall 40, panels 110, 120 or an adjacent wall 40 or bed wall 30 may be by any known fasteners 210. To facilitate removal and/or relocation, angle braces 80A may be fastened to wall 40 in a manner to facilitate quick removal, including, for example, removable fasteners such as screws, clips, tabs and the like.

It is understood that panels 110, 120 may be damaged by errant spray from the waterjet cutting machine. In particular embodiments, panels 110, 120 are constructed of a relatively thin material that may be more easily replaced with relatively less expense. Since front panel 110 faces the waterjet cutting machine, it may be sacrificial in this regard. To facilitate replacement of front panel 110, it may be fastened in a manner to facilitate quick removal and replacement including for example, removable fasteners, such as screws, clips, tabs and the like. Alternatively, wall 40 may be discarded after it is damaged sufficiently to prevent its continued use. According to another embodiment or in combination with this particular embodiment, a non-sacrificial panel may be constructed to withstand errant spray, yet, allow the detection of errant spray.

A detection device is attached to wall 40. Detection device senses the presence of errant spray or other spray that may create a hazardous condition. In general, detection device is in sensing communication with wall 40, or a portion thereof, to detect direct or indirect spray from the waterjet cutting machine that would create an unsafe risk to surrounding equipment or personnel. In general, the waterjet cutting machine directs the pressurized stream toward a cutting zone to cut a workpiece. If an error occurs, the pressurized stream may be directed such that it does not contact the workpiece and the full force of the pressurized stream could be directed at an unintended area, resulting in damage to surrounding equipment or personnel. Alternatively, the pressurized stream of water may contact the workpiece as intended but be deflected by the workpiece to cause a portion of the pressurized stream to be directed to an unintended area. Each of the above examples are generally referred to as errant spray. Detection device is in sensing communication with wall 40 or an area adjacent wall 40 to detect the presence of errant spray. Detection device may include any sensor suitable for detecting errant spray including but not limited to optical, acoustical, motion and electrical devices.

As illustrated in the embodiments of FIGS. 2-3 and 5-7, a detection device includes a transmitter 230 and a receiver 240. The transmitter 230 is positioned at the first end 90 of wall 40 and receiver 240 is positioned at the second end 100 of wall 40. In the expanded view of FIGS. 5 and 7, transmitter 230 and receiver 240 are photoelectric sensors. However, as indicated above, the detection device may be any sensor suitable for detecting errant spray. Transmitter 230 is located opposite receiver 240 with void 130 between. Transmitter 230 and receiver 240 may, alternatively, be attached to the top end 170 and bottom end 180 of wall 40, or attached to the front panel 110 and the rear panel 120 of wall 40, or any combination thereof, depending on the desired orientation of wall 40 and work area 20.

In the examples shown, transmitter 230 and receiver 240 are located outward of ends 90, 100 and on braces 80 to locate the detecting device outward of wall 40. This location is used to minimize the risk that errant spray would damage or destroy components of detection device. Other precautions may be taken to protect detection device such that other locations may be used. Since water may accumulate within wall 40, wall 40 may include troughs that are located beneath detecting device to channel water away from detecting device. For example, as shown in FIGS. 2-4, downwardly angled surfaces may be located beneath transmitter 230 and receiver 240 to channel water down and away from these components to a collection area or tray formed at the base of wall 40. The detection device may be permanently or removably attached to the one or more walls by any known fasteners 210. As illustrated by the exploded views of FIGS. 7-8, the detection devices may be fastened within the wall 40 and accessible by a door panel 250. A gasket 260 may be used to provide a water tight enclosure at the detection device to further protect the detection device from errant spray. The door panel 250 and/or gasket 260 may be fastened to the one or more walls by any known fasteners 210.

A signal is sent from transmitter 230 through void 130 and received by receiver 240. In one particular embodiment, the signal is a continuous signal. In this particular embodiment, the signal forms a light curtain. The light curtain travels from the transmitter 230 to the receiver 240 within the void 130. Signals may also include laser(s), fluid(s), electronic current (s), sound(s), vibration(s), motion, or the like. In this embodiment, the light current spans the entire height 160 of the wall 40, from the bottom end 180 of the wall 40 to the top end 170 of the wall 40, and transmits the entire length 140 of the wall 40, from the transmitter 230 at the first end 90 to the receiver 240 at the second end 100 of the wall 40. In this embodiment, the light curtain is maintained within the enclosed void 130 but may be exposed directly to the work area 20.

Detection device is, at least, activated while the waterjet cutting machine is in operation. In this embodiment, the continuous light curtain creates a signal wall within the void 130 of wall 40. A safe mode is detected when the continuous signal sent by transmitter 230 is received by receiver 240 without interruption. In the safe mode, the high pressure stream of water is safely maintained within the confines of the work area and the operation of the waterjet cutting machine proceeds uninterrupted. An unsafe mode is detected when the continuous signal is interrupted between transmitter 230 and receiver 240. Upon detecting a broken signal, the operation of the waterjet cutting machine 10 is interrupted, changed or stopped.

Detection device identifies the unsafe mode when the signal at the wall 40 is interrupted. In the present embodiment, the signal at wall 40 is interrupted when the high pressure stream of water penetrates the front panel 110, positioned to face the work area. Upon approaching or contacting the front panel 110, the high pressure stream of water creates a mist within void 130. A mist may include any steam, moisture or the like collecting or forming at the wall. The steam or mist interrupts the light curtain or continuous signal. Upon detecting an interruption in the continuous signal, the operation of waterjet cutting machine 10 is immediately stopped or interrupted, as discussed above. By immediately stopping the waterjet cutting machine 10, the individuals, materials and/or equipment in vicinity of the waterjet cutting machine 10 are protected from the high pressure stream of water exiting or escaping the work area 20.

Figure 8:
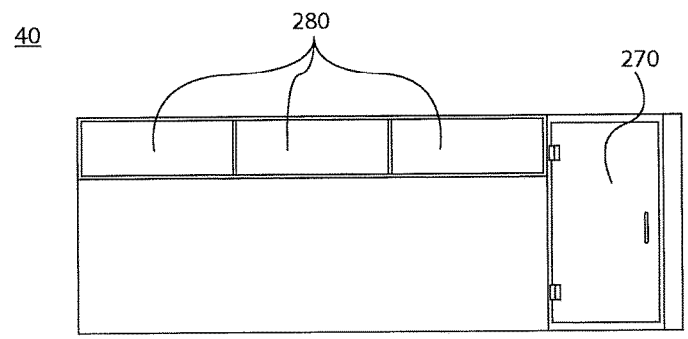
FIG. 8 is an illustration of an embodiment of a waterjet safety enclosure wall in a perspective view illustrating access points, including windows and doors, in accordance with the subject invention.

In particular embodiments, as illustrated by FIG. 8, walls may include one or more door(s) 270, window(s) 280, or other access point(s). The door(s) 270, windows(s) 280 may be configured to provide access within wall 40, to the detection device, to the work area 20, etc. Access points are not limited to doors and windows and may include other points of access including auxiliary panels, key holes, etc. The access points may be rigidly attached or movably attached to the wall. Such attachment mechanisms may include hinges, latches, locks, etc. Additional components or features may be incorporated into the wall 40 to improve the use of the wall for its intended purpose.

In yet other embodiments, the present safety enclosure system may include a double wall system or multi-wall system. Additionally, the present safety enclosure system may also include multiple signals within a single wall 40 (i.e. double light curtains) or may include multiple signals over multiple walls 40.

In yet other particular embodiments, as illustrated by FIGS. 9-18, wall 40 may be adjustable once secured in the safety enclosure system. This may include lateral adjustment, horizontal adjustment, rotatable adjustment or pivotal adjustment. The FIGS. 9-18 illustrate a wall with one or more brackets 290 for securing to a lifting mechanism. As illustrated by FIGS. 9-17, the lift brackets 290 are located at the first end and the second end of the wall. FIG. 10 illustrates an exploded view of one of the one or more lift brackets 290. In this particular embodiment, the lift bracket 290 extends outwardly from the frame of the wall and includes an apertures 310 for securing to a rod 320 of a lifting mechanism 300. The lifting mechanisms 300, as illustrated in FIGS. 15-18, are positioned below the lift brackets 290 for lifting the lift brackets 290 at the first and second ends of the wall.

Figure 18:
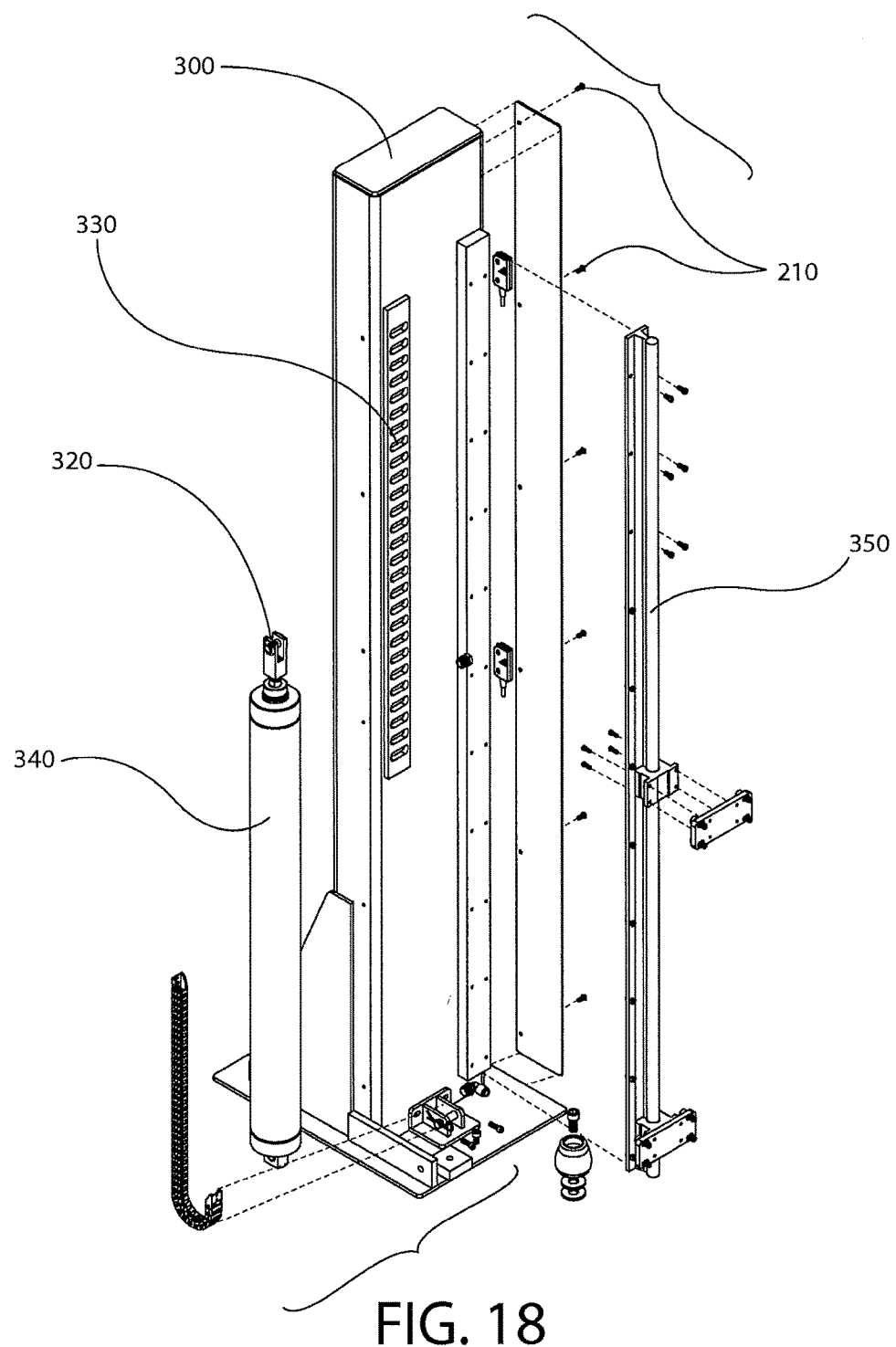
FIG. 18 is an illustration of an embodiment of a lifting mechanism in an exploded view.

One particular embodiment of the lifting mechanism 300 is illustrated in an exploded view of FIG. 18. This particular lifting mechanism 300 uses a combination of a ratcheting assembly 330 and air piston 340 for lifting the wall. It is appreciated that alternative mechanism for lifting or moving the wall may be utilized. It is further appreciated that a track 350 may connect wall 40 to the lifting mechanism 300 to control the direction of movement of wall 40.

In particular embodiments, wall 40 may be configured with lifting points for removing and/or relocating wall 40 in the safety enclosure system. Referring to FIGS. 5-7, wall 40 may comprise one or more plates 360 for connecting the wall to a manual lift of crane. The plates 360 may be positioned at any location on wall 40 to provide adequate support for lifting wall 40.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein but generally known by those of skill in the art.

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., components, devices, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

What is claimed is:

1. A safety enclosure for a waterjet cutting machine comprising:

one or more walls for positioning in a work area wherein each wall includes a first panel, the first panel having a first surface facing toward the work area and a second surface facing away from the work area, a first end and a second end, wherein the wall defines a void adjacent to the second surface between the first end and the second end;

a detection device in sensing communication with at least a portion of the one or more walls for detecting errant spray from the work area.

2. The safety enclosure system of claim 1, further comprising a controller in communication with the detection device, wherein the controller is adapted to send a termination signal upon detecting errant spray.

3. The safety enclosure of claim 1, wherein the detection device includes a signal generated within the void and wherein the detection device detects interruption of the signal caused by the errant spray.

4. The safety enclosure of claim 1, wherein the detection device comprises a transmitter located at the first end and a receiver located at the second end, the transmitter sending a signal to the receiver within the void, and wherein detection device detects the errant spray from an interrupting of the signal.

5. The safety enclosure of claim 4, wherein the signal includes a light curtain.

6. The safety enclosure of claim 1, wherein the detecting device includes at least one of an optical, acoustical, a motion and an electrical sensor.

7. The safety enclosure of claim 1 wherein the wall includes a frame, the front panel being removably attached to the frame.

8. The safety enclosure of claim 7, wherein the frame is formed by one or more framing members, the one or more framing members being spaced laterally along the length of the wall and each framing member extending along at least a portion of a height of the wall, wherein the one or more framing members define one or more slots; the detection device generating a signal, wherein the signal passes through the one or more slots.

9. The safety enclosure of claim 1, wherein each wall further includes a back panel, wherein the front panel faces toward the work area and wherein the back panel is spaced outward from the front panel.

10. The safety enclosure of claim 1 further comprising at least one bed wall, wherein the front panel is supported inward of the bed wall defining the void between the bed wall and the front panel.

11. The safety enclosure of claim 1 further comprising a lifting mechanism connected to the one or more walls, wherein the lifting mechanism is adapted move the one or more walls to a selected position.

12. The safety enclosure of claim 11, wherein the lifting mechanism includes an air piston connected to one or more walls and adapted to apply a lifting force thereto, and a ratcheting assembly adapted to fix the wall against the lifting force in one of plural selected positions.

13. A safety enclosure comprising:
one or more walls defining a work area wherein each wall includes a first panel, the first panel having a first surface facing toward the work area and a second surface facing away from the work area, a first end and a second end;
a detection device including a transmitter and a receiver supported adjacent to the first panel defining a void there between, wherein the transmitter directs a signal to the receiver through the void and wherein the detection device detects an errant spray upon interruption of the signal.

14. The safety enclosure of claim 13, wherein the transmitter and receiver are located outward of the second surface of the front panel relative to the work area, and wherein the void is formed adjacent to the second surface of the front panel.

15. The safety enclosure of claim 13 further comprising a waterjet cutting machine located within the work area and adapted to perform a cutting operation; a controller in communication with the waterjet cutting machine and the detection device, wherein upon detecting an errant spray, the controller signals the waterjet cutting machine to stop the cutting operation.

* * * * *